United States Patent [19]

Satoh et al.

[11] Patent Number: 4,695,916
[45] Date of Patent: Sep. 22, 1987

[54] PROTECTOR CIRCUIT

[75] Inventors: Hidetaka Satoh, Tokorozawa;
Hideyuki Kurosawa, Hachioji;
Yoshiaki Kamijoh, Kitatsuru;
Hiromichi Jyumonji, Kunitachi, all of
Japan

[73] Assignee: Nippon Telegraph and Telephone
Corporation, Tokyo, Japan

[21] Appl. No.: 809,825

[22] Filed: Dec. 17, 1985

[30] Foreign Application Priority Data

Dec. 24, 1984 [JP] Japan .................. 59-272555

[51] Int. Cl.⁴ ............................................. H02H 9/00
[52] U.S. Cl. ........................................ 361/56; 361/91;
361/111; 361/119
[58] Field of Search ................. 361/56, 91, 110, 111,
361/117, 118, 119

[56] References Cited

U.S. PATENT DOCUMENTS

| | | | |
|---|---|---|---|
| 4,282,555 | 8/1981 | Suedberg | 361/56 |
| 4,377,832 | 3/1983 | Toney et al. | 361/56 |
| 4,456,940 | 6/1984 | Hammerberg et al. | 361/56 |
| 4,571,656 | 2/1986 | Ruckman | 361/56 |
| 4,587,588 | 5/1986 | Goldstein | 361/56 X |

OTHER PUBLICATIONS

"Suppression of Fast Rise-Time Transients" by O. Melville Clark 1st Symposium and Technical Exhibition on Elastromagnetic Compatibility, Montreau, May 20-22, 1975.

Primary Examiner—A. D. Pellinen
Assistant Examiner—Derek S. Jennings
Attorney, Agent, or Firm—Pollock, Vande Sande and Priddy

[57] ABSTRACT

A protector circuit comprises series connection of a bidirectional voltage limiting element and a bidirectional thyristor between a signal line connected to a communication equipment and ground. The breakdown voltage $V_B$ of the bidirectional voltage limiting element is set to be slightly higher than the battery feed voltage $V_{Bf}$ on the signal line and lower than a predetermined non-operation voltage $V_A$ of the protector circuit. The sum of the breakdown voltage $V_B$ and the break-over voltage $V_{BO}$ of the bidirectional thyristor is set to be lower than breakdown voltage $V_R$ of the equipment and higher than the non-operation voltage $V_A$.

12 Claims, 17 Drawing Figures

PRIOR ART

PROTECTOR CIRCUIT

BACKGROUND OF THE INVENTION

This invention relates to protector circuits for protecting communication equipments for analog or digital transmission systems from lightning surges applied to signal lines.

Protector circuit standards for digital transmission systems with a transmission speed of 200 kb/sec. are as follows.

Limit voltage (i.e., breakdown voltage of communication equipment) $V_R$ is no higher than 320 V.

Battery feed voltage (i.e., voltage supplied from a telephone exchange to a subscriber's communication equipment) $V_{Bf}$ is 30 V (between core line and ground).

Non-operation voltage (i.e., the sum of the 50/60 Hz induced voltage on commercial power line, crosstalk of telephone bell ringer voltage and battery feed voltage, at which non-operation voltage the protector circuit should not be operated) $V_A$ is 100 V. In a protector circuit in an analog transmission system, the non-operation voltage is the ringer voltage of 120 V. And the protector circuit is designed such that it will not be operated at this ringer voltage of 120 V.

Electrostatic capacitance C is no higher than 250 pF. (Transmission loss standards specify that the signal line impedance with respect to ground should be 4 kΩ or above for the maximum frequency component of the transmitted signal.)

Surge current withstanding capability (i.e., current caused through the protection circuit by application of a lightning surge waveform [10/1,000] μsec rising to a peak voltage in 10 μsec. and exponentially falling to one half the peak voltage in 1,000 μsec) $I_p$ is greater than 58A.

Figure 1:
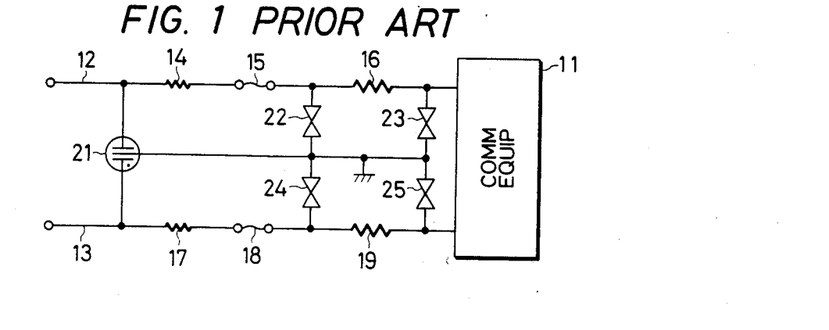
FIG. 1 is a circuit diagram showing a prior art protector circuit used for an analog transmission system.

FIG. 1 shows a prior art protector circuit for switchboard analog circuits. The circuit comprises a series connection of resistor 14, fuse 15 and resistor 16 and another series connection of resistor 17, fuse 18 and resistor 19, these series connections being inserted in pair signal lines (i.e., subscriber's line) 12 and 13 connected to subscriber's communication equipment 11. Resistors 14 and 17 are grounded at the ends thereof opposite from switchboard 11 through a three-electrode gas-filled protector (discharge tube) 21. Resistors 16 and 19 are grounded at the both ends thereof through zinc oxide varistors 22 to 25.

When a lightning surge voltage is applied to signal line 12, discharge is caused in the three-electrode gas-filled protector 21 between signal line 12 and ground. Due to the resultant discharge light or ions, the other side of the discharge tube 21 between signal line 13 and ground is triggered to discharge. The voltage on signal lines 12 and 13 consequently becomes the arc voltage of discharge tube 21, which is 20 to 50 V, thus protecting equipment 11 from the lightning surge voltage.

The discharge trigger voltage and discharge delay time of the discharge tube, however, vary greatly, i.e., 300 to 800 V and 0.3 to 3.0 μsec., depending on the input surge voltage rising time. In addition, the response time of the three-electrode gas-filled protector is large. Before the discharge of discharge tube 21 is initiated, the lightning surge voltage appears across varistors 22 to 25, so that communication equipment 11 is protected by the "on"-state voltage across varistors 22 to 25 until the sum of the "on"-state voltage across varistors 22 and 24 and the voltage drop across resistors 14 and 17 is sufficiently increased to start discharge of three electrode gas-filled protector 21.

In the protector circuit shown in FIG. 1, it is necessary to make up for fluctuations of the discharge characteristics of three-electrode gas-filled protector 21. Also, it is necessary to solve problems due to the delay of discharge. To ensure necessary surge protection characteristics, varistors, resistors, etc. are used. The circuit, therefore, comprises a large number of components and inevitably has a large size. In addition, the varistors should withstand high surge voltage, leading to an extra electrostatic capacitance.

Figure 2:
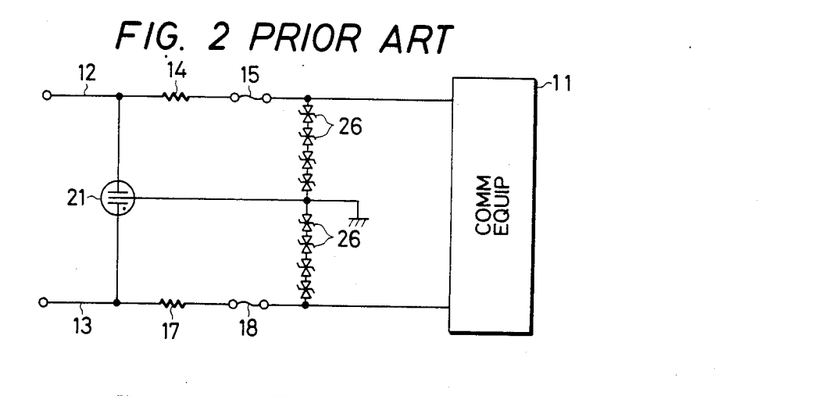
FIG. 2 is a circuit diagram showing a prior art protector circuit used for a digital transmission system.

FIG. 2 shows another prior art protector circuit which is designed for digital transmission systems. This circuit uses, in lieu of varistors, series connections of a plurality of bilateral voltage limiting elements 26, e.g., bilateral zener diodes (avalanche diodes) are used. In order to reduce capacitance, the series connection of bilateral voltage limiting elements 26 is fabricated as a lamination. The lamination has a large number of layers and requires a complicated manufacturing process.

Meanwhile, the varistor has a low voltage non-linearity index. Therefore, even if a multi-stage surge protection circuit is employed (e.g., three-stage in the case of FIG. 1), the communication equipment 11 should be designed to have a high breakdown voltage to cover variation in limiting voltage of the varistor.

Figure 3:
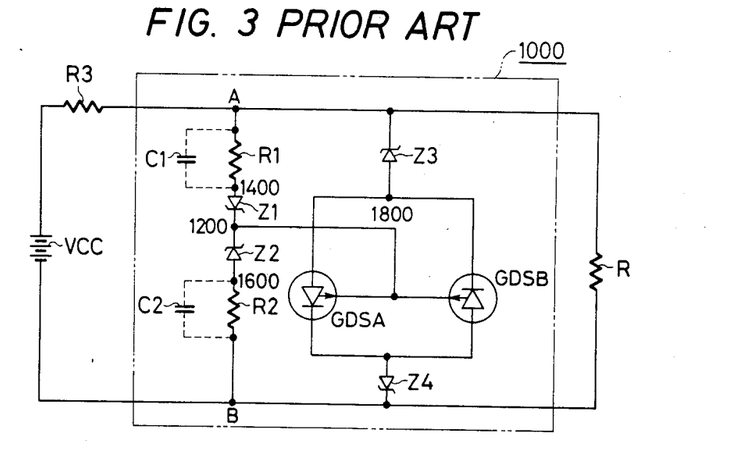
FIG. 3 is a circuit diagram showing a prior art protector circuit using zener diodes and thyristors.

While the protector circuits shown in FIGS. 1 and 2 are actually used, there has been proposed a protector circuit, which does not use any lightning tube but uses thyristors, as shown in FIG. 3. This circuit is disclosed in U.S. Pat. No. 4,322,767 (filed on Feb. 11, 1980) entitled "Bidirectional Solid-State Protector Circuitry Using Gated Diode Switches". In this protector circuit, upon application of a positive lightning surge voltage to point A, the voltage at point 1200 is clamped by Zener diode Z2 to a fixed voltage. At this time, zener diode Z3 is turned on so that the lightning surge voltage is applied to point 1800. The voltage at point 1800 thus exceeds the voltage at point 1200 to cause current to the gate of unidirectional thyristor GDSA, thus turning on the thyristor GDSA. When the applied lightning surge voltage is reduced, zener diode Z3 is turned off to turn off thyristor GDSA. Zener diodes Z1 and Z4 and thyristor GDSB are provided for negative lightning surge voltages.

This protector circuit has a voltage detector, the output of which is fed to the gate of the thyristor to turn on the thyristor. The voltage detector includes a large number of components and has a complicated construction. In addition, zener diodes Z3 and Z4 can not be constructed as a single element. FIG. 3 shows only a portion of the circuit that is connected to signal line 12 shown in FIG. 1, that is, it is necessary to connect the same circuit to signal line 13. Further, zener diodes Z3 and Z4 are necessary for controlling the thyristor gate, and their breakdown voltage can not be determined in relation to the battery feed voltage on the signal line.

Figure 4:
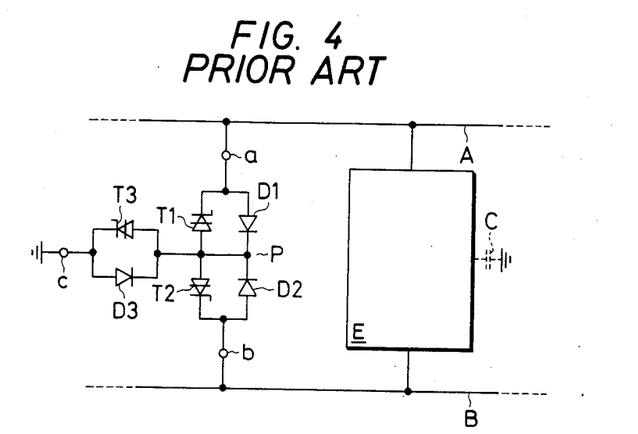
FIG. 4 is a circuit diagram showing a prior art protector circuit using thyristors operated with a high holding current.
Figure 5:
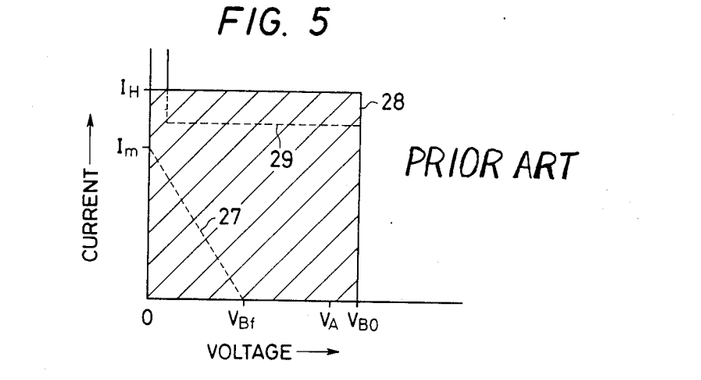
FIG. 5 is a graph showing a current versus voltage characteristic of the circuit shown in FIG. 4.

FIG. 4 shows another prior art protector circuit disclosed in U.S. Pat. No. 4,282,555 (filed on Aug. 13, 1979) entitled "Overvoltage Protection Means for Protecting Low Power Semiconductor Components". When the voltage on signal line A exceeds the sum of forward "on" voltage of diode D1 and break-over voltage $V_{BO}$ of unidirectional thyristor T3 as a result of application of a positive lightning surge voltage, diode D1 and thyristor T3 are turned on. When the lightning surge voltage is reduced so that the surge current becomes lower than holding current $I_H$ of unidirectional thyristor T3, thyristor T3 is turned off. When a negative lightning surge voltage is applied to signal line A, diode D3 and thyristor T1 are turned on.

Where the current versus voltage characteristic of power supplied to the communication equipment via signal lines is as shown by line 27 in FIG. 5, holding current $I_H$ of thyristors T1 and T3 should be above maximum current $I_m$. In order to attain a large holding current $I_H$, conventional surge protector circuits employ thyristors of an emitter short-circuited structure, resulting in increased chip areas therefor. In addition, break-over voltage $V_{B0}$ of the thyristor is set to be higher than non-operation voltage $V_A$ lest the thyristor should turn on at non-operation voltage $V_A$. Therefore, the current versus voltage characteristic of the thyristor has been set as shown by curve 28. The thyristor thus momentarily consumes a high power of $V_{B0} \times I_H$ (shown shaded in the Figure) when it is turned on. To increase the surge withstanding capability, therefore, the thyristor has been designed to have a large chip area. In this manner, the conventional surge protector circuit must use thyristors of increased chip areas, thus increasing capacitance to deteriorate the signal transmission characteristics of the signal lines. This method, therefore, is not suited for high speed transmission systems. Further, heating of the thyristor due to lightning surge current therein reduces its holding current as shown by dashed line 29. Until the thyristor temperature is lowered to cause the holding current to exceed the supply current, the thyristor is held in ON-state, while the supply current flows therethrough, disabling the communication equipment. That is, communication remains interrupted until the holding current becomes higher than the supply current as the thyristor temperature falls again. For example, when the holding current of the thyristor which is 150 mA at normal temperature is reduced to 0 due to a rise of the thyristor peak temperature to 250° to 300° C. caused by a lightning surge, the thyristor temperature should become lower than 100° C. to regain a holding current in excess of the supply current of 120 mA. This takes a time period of at least 10 msec. During this period of at least 10 msec., the communication is interrupted. To obtain quick thyristor temperature fall, it is necessary to use a double heatsink diode structure of silver, a good heat conductor, leading to a high price.

In the protector circuits shown in FIGS. 3 and 4, an independently operable protector circuit is connected to each signal line. Therefore, when a lightning surge is applied with phase differences to a plurality of signal lines leading from a communication equipment, or when there are fluctuations of the timing of start of operation of the protection circuits to the individual signal lines, a large transverse mode voltage is liable to be produced between signal lines through the communication equipment connected therebetween. Such a transverse mode voltage will cause rupture of the communication equipment.

French Pat. No. 2,498,387 discloses a further protector circuit. In this circuit, a voltage detector is used to detect a surge voltage, and the detector output is used to simultaneously control the gates of bidirectional thyristors connected between the pair signal lines and ground, respectively, to simultaneously turn on the two thyristors. The transverse mode voltage noted above, therefore, is not generated in this case. However, the voltage detector for detecting the surge voltage is complicated. In addition, a delay is involved in the surge detection. Therefore, a grounded bidirectional voltage limiting element is connected between each signal line and ground to provide protection against surges until the thyristor is turned on.

SUMMARY OF THE INVENTION

Therefore, an object of the invention is to provide a protector circuit having a short response time.

Another object of the invention is to provide a protector circuit which has fewer components and a simpler construction so that it can be constructed in a small size, while also being applicable to high speed transmission systems.

Another object of the invention is to provide a protector circuit which has fewer components and a simpler construction and can prevent generation of a transverse mode voltage across an equipment having a plurality of signal lines.

According to one feature of the invention, a series connection of a bidirectional voltage limiting element and a two-terminal bidirectional thyristor, is inserted between a signal line connected to a communication equipment and ground. Breakdown voltage $V_B$ of the bidirectional voltage limiting element is set to be slightly higher than battery feed voltage $V_{Bf}$ on the signal line. The sum $(V_B + V_{B0})$ of breakdown voltage $V_B$ noted above and break-over voltage $V_{B0}$ of the bidirectional thyristor is set to be lower than breakdown voltage $V_R$ of the equipment and higher than non-operation voltage $V_A$, that is, $V_R > (V_B + V_{B0}) > V_A$. When a lightning surge voltage is applied to the signal line so that the voltage thereon exceeds $(V_B + V_{B0})$, the bidirectional voltage limiting element and bidirectional thyristor are both turned on to protect the equipment from the lightning surge. When the lightning surge voltage becomes lower than $V_B$, the bidirectional voltage limiting element and bidirectional thyristor are both turned off due to $V_B > V_{Bf}$. Since both elements are turned off by the operation of the bidirectional voltage limiting element, the holding current of the bidirectional thyristor may be low, and it is possible to extremely reduce the power consumed by the bidirectional thyristor and to reduce the size thereof.

Where a plurality of signal lines are connected to equipment, a series connection of a bidirectional voltage limiting element and a three-terminal bidirectional thyristor may be connected between each signal line and ground, with the gate terminals of the individual bidirectional thyristors connected together and held open without being connected to any other part. When the bidirectional voltage limiting element and bidirectional thyristor in one of the series connections in this structure are turned on with a lightning surge, the gate-cathode voltage on this thyristor is applied as a control signal to the gate terminals of the other bidirectional thyristors that are connected to the gate terminal noted above, so that these thyristors are also turned on. Thus, there is no possibility of generation of a transverse mode voltage.

According to another feature of the invention, a circuit consisting of a first bidirectional voltage limiting element, a three-terminal bidirectional thyristor connected in series with the first bidirectional voltage limiting element and a second bidirectional voltage limiting element connected between the gate and anode terminals of the bidirectional thyristor, is connected between a signal line of communication equipment and ground. Breakdown voltage $V_{B1}$ of the first bidirectional voltage limiting element is set to be slightly higher than battery feed voltage $V_{Bf}$ on the signal line. Also, the sum $(V_{B1}+V_{B2}+V_{GK})$ of that breakdown voltage $V_{B1}$, breakdown voltage $V_{B2}$ of the second bidirectional voltage limiting element and gate-cathode voltage $V_{GK}$ of the bidirectional thyristor, is set to be lower than breakdown voltage $V_R$ of the equipment and higher than non-operation voltage $V_A$. Further, breakdown voltage $V_{B2}$ is set lower than break-over voltage $V_{B0}$ of the bidirectional thyristor. With this structure, when the voltage on the signal line exceeds $(V_{B1}+V_{B2}+V_{GK})$ due to application of a lightning surge voltage to the signal line, both the first and second bidirectional voltage limiting elements are turned on to cause current to flow to the gate terminal of the bidirectional thyristor and turn it on, so that the equipment is protected from the lightning surge. When the lightning surge voltage becomes lower than $V_{B1}$, the first bidirectional voltage limiting element and bidirectional thyristor are turned off. Again in this case, the bidirectional thyristor may be one that consumes low power. Where a plurality of signal lines are connected to equipment, the circuit consisting of the first and second bidirectional voltage limiting elements and three-terminal bidirectional thyristor may be connected between each signal line and ground, with the gates of the individual bidirectional thyristors connected together. With this arrangement, the generation of a transverse mode voltage can be prevented.

According to a further feature of the invention, a three-terminal bidirectional thyristor is connected between each of a plurality of signal lines of communication equipment and ground, a bidirectional voltage limiting element is connected between the gate and anode terminals of each of these bidirectional thyristors, and the gate terminals of these bidirectional thyristors are connected together. Holding current $I_H$ of the bidirectional thyristors is set to be higher than battery feed current $I_{Bf}$ in the signal lines, and break-over voltage $V_{B0}$ of the bidirectional thyristors is set to be higher than breakdown voltage $V_B$ thereof. With this structure, when a bidirectional voltage limiting element is turned on by application of a lightning surge voltage to a signal line, current is caused to flow to the gate of the associated bidirectional thyristor and turn it on. At the same time, current is caused to flow to the gate terminals of the thyristors connected to the gate terminal noted above. The thyristors are turned off when the current due to the lightning surge becomes lower than their holding current. It will thus be readily understood that the generation of a transverse mode voltage can be well prevented in comparison with the case where the gate terminals of thyristors are not connected to one another. A resistor may be connected between the juncture of the bidirectional thyristor gate terminals and ground to control the holding current of the thyristors by appropriately selecting the resistance of the resistor.

In the above individual features of the invention, in the case where a commercial power line is connected to the communication equipment, application of a lightning surge voltage to the equipment may be prevented by connecting a three-terminal bidirectional thyristor between the commercial power line and ground and connecting the gate terminal of this thyristor to the gate terminals of the bidirectional thyristors connected between the signal lines and ground. In this way, it is possible to prevent a transverse mode voltage form being generated between the commercial power line and signal lines.

DESCRIPTION OF THE PREFERRED EMBODIMENTS

Figure 6:
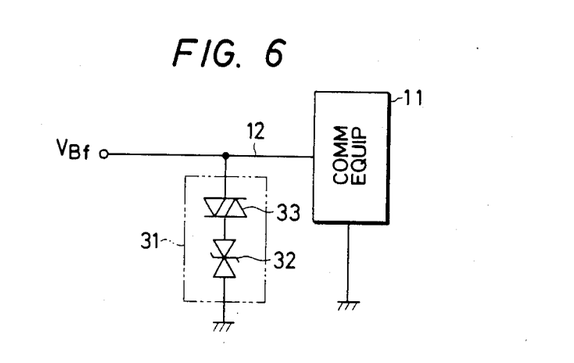
FIG. 6 is a circuit diagram showing an embodiment of the protector circuit according to the invention where thyristors are turned on through break-over.

FIG. 6 shows an embodiment of protector circuit according to the invention. Protector circuit 31 according to the invention is connected between signal line 12 leading from equipment 11, i.e., a communication equipment, and ground. Protector circuit 31 comprises bidirectional voltage limiting element 32 and two-terminal bidirectional thyristor 33 in series therewith. Bidirectional voltage limiting element 32 may be a bidirectional zener diode (avalanche diode), a varistor, etc. Bidirectional thyristor 33 may be a SSS (silicon symmetrical switch) element without any gate terminal. Or it may be a triac with an open gate terminal (i.e., with the gate terminal connected to nowhere). Bidirectional voltage limiting element 32 has a breakdown voltage $V_B$ slightly higher than battery feed voltage $V_{Bf}$ on signal line 12. The sum $(V_{B0}+V_B)$ of break-over voltage $V_{B0}$ of bidirectional thyristor 33 and breakdown voltage $V_B$ noted above is set to be lower than breakdown voltage $V_R$ of equipment 11 but is higher than non-operation voltage $V_A$.

Figure 7A:
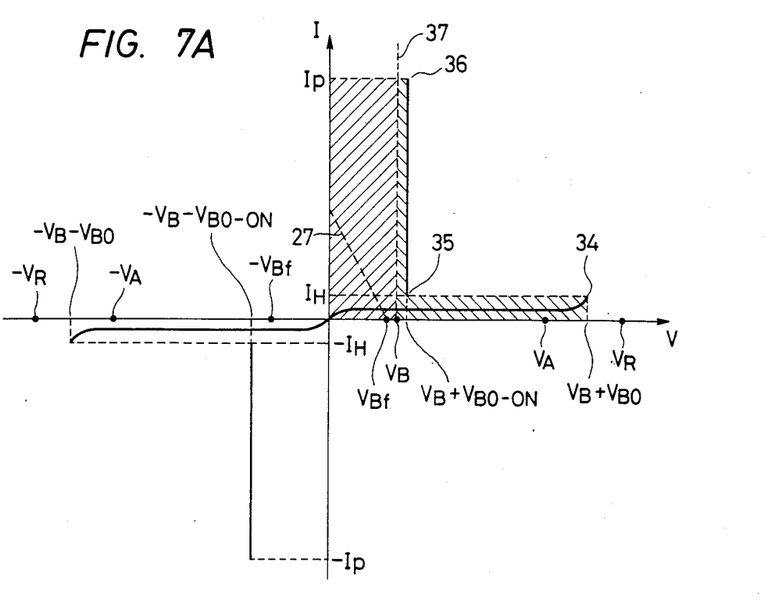
FIG. 7A is a graph showing a current versus voltage characteristic of the circuit shown in FIG. 6.

It is now assumed that $V_B$ and $V_{B0}$ are 35 V and 85 V, respectively. The voltage on signal line 12 is increased upon application of a lightning surge to the line. When the voltage reaches the sum of break-over voltage $V_{B0}$ of bidirectional thyristor 33, i.e., 85 V, and breakdown voltage $V_B$ of bidirectional voltage limiting element 32, i.e., 35 V, the sum being 120 V as shown by point 34 in FIG. 7A, bidirectional voltage limiting element 32 is turned on through breakdown, and bidirectional thyristor 33 is turned on through break-over. Once bidirectional voltage limiting element 32 is turned on, it is held at the fixed breakdown voltage $V_B$. However, operating voltage $V_{B0}$ of bidirectional thyristor 33 becomes 1 to 3 V, a forward operating voltage of diode. The voltage between signal line 12 and ground, therefore, is reduced to the sum of these voltages, as shown at point 36, which is 36 to 39 V. Thus, it is possible to extremely reduce adverse effects of overvoltage on equipment 11. In addition, the voltage at point 35 will never become lower than battery feed voltage $V_{Bf}$. Thus, there is no possibility that the overload protection function of a power supply system will cause a malfunction. Lightning surge current $I_p$ occurs under this small voltage drop condition. Since the lightning surge current is 58 A in the average, when a lightning surge is approximated by a 1-msec. pulse, energy loss E in protector circuit 31 is given as $$E = \int_0^t V_B \cdot I_p dt + \int_0^t V_{B0-ON} \cdot I_p dt$$

$$= 3 (V) \times 58 (A) \times 10^{-3} (sec.) + 35 (V) \times 58 (A) \times 10^{-3} (sec.)$$

$$= 0.174 (J) + 2.03 (J)$$

$$= 2.2 (J)$$

Particularly, energy loss in bidirectional thyristor 33 is only 0.174 J. Therefore, bidirectional thyristor 33 may have a chip area as small as about 4 mm, and also its capacitance $C_T$ may be made as low as 50 pF.

Figure 7B:
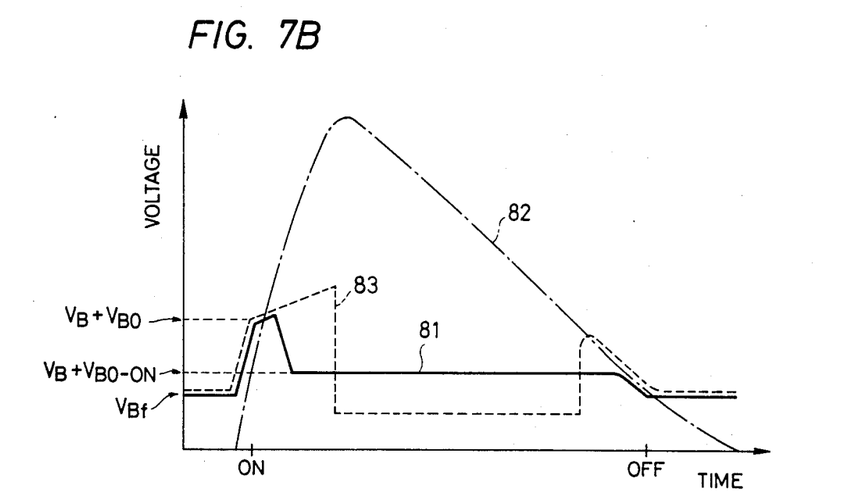
FIG. 7B is a graph showing a response characteristic of the circuit shown in FIG. 6.

With breakdown voltage $V_B$ of bidirectional voltage limiting element 32 set to 35 V, which is slightly higher than supply voltage $V_{Bf}$ of 30 V, the surge current can be reduced. In effect, when the voltage is reduced from point 36 to point 35, the continual current due to supplied power will vanish, thus turning off both bidirectional voltage limiting element 32 and bidirectional thyristor 33. Thus, a surge response characteristic as shown by plot 81 in FIG. 7B can be obtained. In the Figure, plot 82 shows the input surge, and plot 83 shows the response characteristic of the prior art circuit shown in FIG. 1.

Referring to FIG. 7A, the shaded area on the right side of line 37 for $V = V_{Bf}$ represents power consumed by bidirectional thyristor 33, while the shaded area on the left side of line 37 represents power consumed by bidirectional voltage limiting element 32. Holding current $I_H$ of bidirectional thyristor 33 thus can be reduced to reduce power consumption and hence size thereof. Further, bidirectional voltage limiting element 32 may have a chip area as small as 5.6 mm, and also its capacitance $C_Z$ may made as low as 280 pF. Capacitance C of the entire protector circuit, which is the series capacitance constituted by capacitances $C_Z$ and $C_T$ of bidirectional voltage limiting element 32 and bidirectional thyristor 33, may be as small as $$C = \frac{C_T \cdot C_Z}{C_T + C_Z} = \frac{50 \times 280}{50 + 280} = 43 \text{ pF}$$

Figure 8:
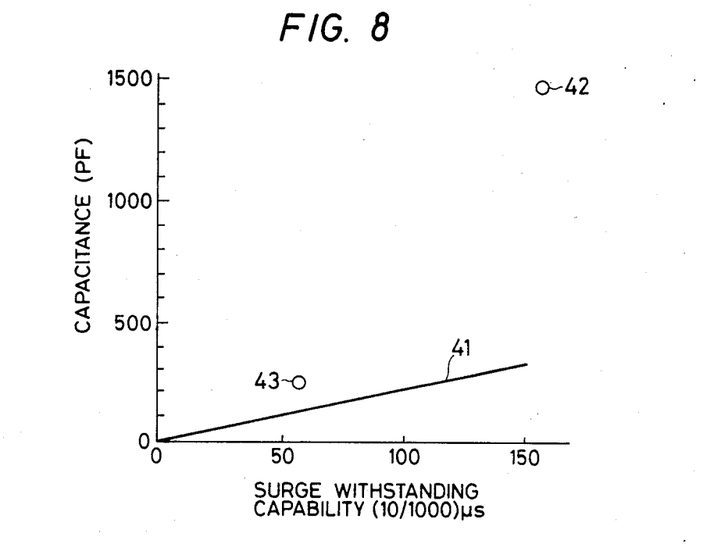
FIG. 8 is a graph showing a capacitance versus surge withstanding capability relation of the protector circuit of the invention.

The protector circuit thus can be employed for high-speed, wide bandwidth communication purposes. With the protector circuit according to the invention the capacitance with respect to surge withstanding capability $(10/1000)\mu s$ is as shown by plot 41 in FIG. 8, whereas with the prior art protector circuit shown in FIG. 1 it is as high as shown at point 43, roughly double the value according to the invention.

Further, according to the invention, unlike the case where a surge voltage is detected and the detection output is used to turn on thyristors, only two components are necessary in the structure of FIG. 6. In other words, according to the invention fewer components are needed compared to the prior art structure, so that the construction is simpler and can be fabricated more inexpensively. Further, the circuit may be designed to comply with various different standards by suitably selecting breakdown voltage $V_B$ and break-over voltage $V_{B0}$, that is, it has great freedom of design and permits approximation of ideal characteristics.

Further, unlike the case where a surge voltage is detected by a surge voltage detector and the output thereof is used to turn on thyristors, according to the invention the lightning surge voltage is applied directly to the thyristor. Thus, it is possible to quickly respond to the lightning surge voltage application and hold operating voltage fluctuations within about 10 V, permitting operating voltage $(V_B+V_{B0})$ to be 120 to 150 V inclusive of the manufacturing fluctuations. In the prior art protector circuit shown in FIG. 1, the operating voltage fluctuates greatly from 120 to 195 V. With the protector circuit according to the invention with less fluctuations as noted above, it is possible to reduce the breakdown voltage of the LSI of equipment 11 (e.g., subscriber's circuit) from 320 V to 270 V and reduce the chip area of the LSI by about 20%.

Further, zinc oxide varistors may be used for bidirectional voltage limiting element 32 to provide the protector circuit inexpensively. The zinc oxide varistor has a low voltage non-linearity index. The limit voltage, therefore, has dependency on the high input lightning surge voltage. Assuming the breakdown voltage $V_B$ of the zinc oxide varistor to be 120 V, the limit voltage is increased to 195 V by application of a lightning surge with a peak of 15 kV. According to the invention, however, the bidirectional thyristor undergoes break-over to reduce voltage from $V_{B0}+V_B$ to $V_{B0-ON}+V_B$, i.e., reduce by $V_{B0}-V_{B0-ON}$. Therefore, even if the breakdown voltage is increased to $V_B+\delta$ with increase of the lightning surge current, the limit voltage is substantially independent of the input surge voltage because $\delta$ is lower than $V_{B0}-V_{B0-ON}$.

Further, according to this protector circuit, the continual current is cut by the bidirectional voltage limiting element. Therefore, the normal state, e.g., communication state, can be quickly restored after the lightning surge application, that is, the communication interruption period can be reduced. Furthermore, unlike the prior art multi-stage protection circuit shown in FIG. 1, no resistor is connected in series with the signal line. It is thus possible to reduce transmission loss and increase transmission distance.

Figure 9:
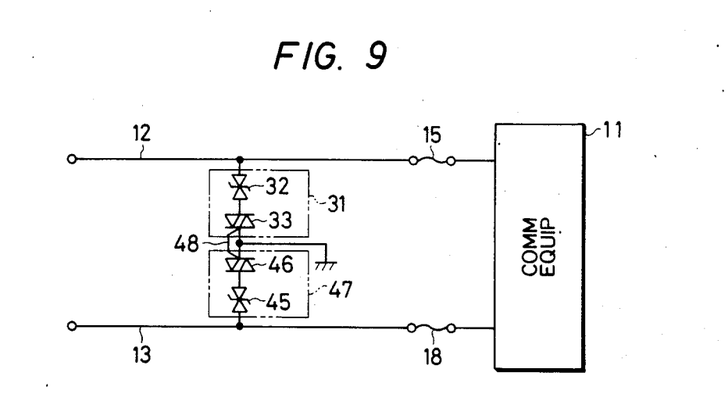
FIG. 9 is a circuit diagram showing an example of application of the circuit of FIG. 6 to an equipment having two signal lines.

As shown in FIG. 9, where signal lines 12 and 13 connected to equipment 11 are return trip lines, series connection 47 of bidirectional voltage limiting element 45 and bidirectional thyristor 46 may be connected between signal line 13 and ground just like series connection 31 of bidirectional voltage limiting element 32 and bidirectional thyristor 33 is connected between signal line 12 and ground. In this case, in order to prevent equipment 11 from rupture of operation which would be caused by application of a lightning surge through equipment 11 due to phase difference in the lightning surge on signal lines 12 and 13, the gate terminals of bidirectional thyristors 33 and 46 may be connected together by line 48. Line 48 is connected to no other part, that is, the gate terminals are held open. When bidirectional voltage limiting element 32 and bidirectional thyristor 33 are turned on by application of a lightning surge voltage to signal line 12, a voltage is generated between the gate and cathode terminals of bidirectional thyristor 33 due to current therein. This voltage is fed through line 48 to the gate terminal of the other bidirectional thyristor 46 to turn on this bidirectional thyristor 46. Thus, application of a lagging phase lightning surge voltage to signal line 13 will not result in the generation of any transverse mode voltage between signal lines 12 and 13, so that equipment 11 can be protected.

Figure 10:
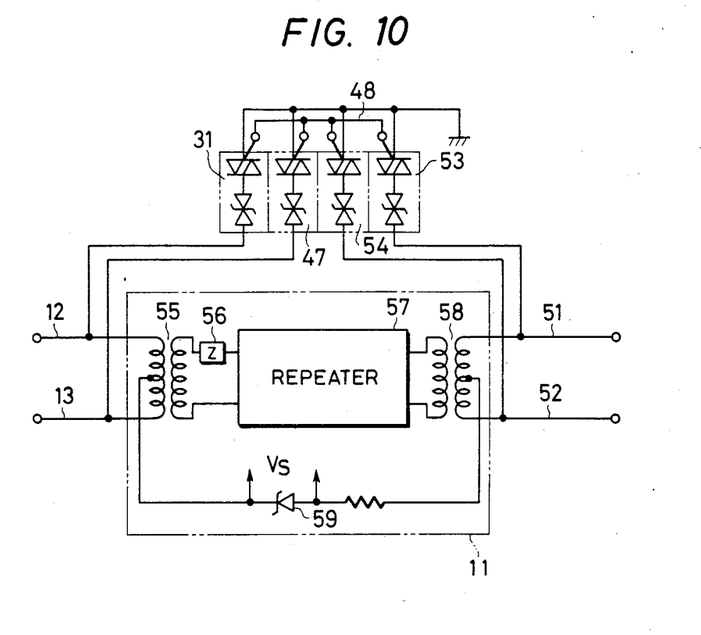
FIG. 10 is a circuit diagram showing an example of application of the circuit of FIG. 6 to an equipment having four signal lines.

In the example of FIG. 9, fuses 15 and 18 are inserted in series in respective signal lines 12 and 13. With this arrangement, when a 200-V commercial power supply voltage appears between signal lines 12 and 13, the components of series connections 31 and 47 are turned on, and short-circuit of the components is caused by the resultant current therein so that equipment 11 is protected. But even if open-circuit of series connections 31 and 47 is caused, equipment 11 is protected by the disconnection of fuses 15 and 18.

Where equipment 11 is connected to input signal lines 12 and 13 and output signal lines 51 and 52 like a submarine repeater, series connections 31, 47, 53 and 54 each consisting of a bidirectional voltage limiting element and a bidirectional thyristor are each connected between each of signal lines 12, 13, 51 and 52 and ground as shown in FIG. 10. Further, to prevent generation of a transverse mode voltage between signal lines 12, 13, 51 and 52, gate terminals of the bidirectional thyristors in series connections 31, 47, 53 and 54 are connected to line 48, which is connected to no other part to hold the gate terminals open. Input signal lines 12 and 13 are connected to the input side of LSI repeater 57 through transformer 55 and impedance matching element 56. The output side of repeater 57 is connected to output signal lines 51 and 52 through transformer 58. Zener diode 59 is connected between a primary side center tap of transformer 55 and a secondary side center tap of transformer 58. The terminal voltage across zener diode 59 is applied as power source voltage to repeater 57.

Figure 11:
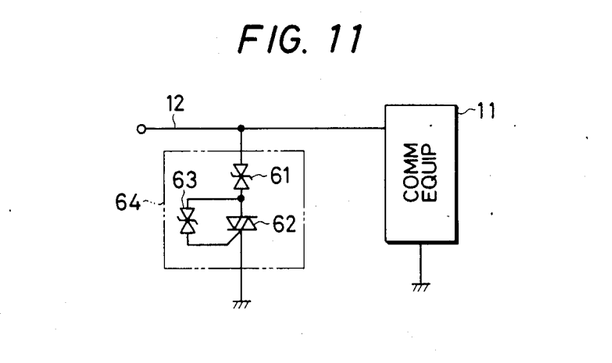
FIG. 11 is a circuit diagram showing an embodiment of the protector circuit according to the invention where thyristors are turned on through gate control for blocking voltage.

In the above example of FIG. 10, each bidirectional thyristor is turned on through break-over by a lightning surge voltage. Alternatively, the gate terminal of the bidirectional thyristor may be controlled to turn on the thyristor. FIG. 11 shows such an example. In this example, a series connection of bidirectional voltage limiting element 61 and three-terminal bidirectinal thyristor 62 is connected between signal line 12 and ground, and bidirectional voltage limiting element 63 is connected between the gate and anode terminals of bidirectional thyristor 62. Bidirectional voltage limiting elements 61 and 63 and bidirectional thyristor 62 constitute protector circuit 64. The sum $(V_{B1}+V_{B2}+V_{GK})$ of breakdown voltages $V_{B1}$ and $V_{B2}$ of bidirectional voltage limiting elements 61 and 63 and gate-cathode voltage $V_{GK}$ of bidirectional thyristor 62 is set to be lower than breakdown voltage $V_R$ of equipment 11 and higher than non-operation voltage $V_A$. Breakdown voltage $V_{B1}$ is set to be slightly higher than battery feed voltage $V_{Bf}$ on signal line 12. Breakdown voltage $V_{B2}$ is set to be lower than break-over voltage $V_{B0}$ of bidirectional thyristor 62. Bidirectional voltage limiting elements 61 and 63 may be zener diodes, varistors, etc.

When a lightning surge voltage is applied to signal line 12, voltage limiting elements 61 and 63 are simultaneously turned on through breakdown. The current thus caused is fed to the gate terminal of bidirectional thyristor 62 to turn on the thyristor, whereby equipment 11 is protected against the lightning surge. When the lightning surge voltage is reduced to become lower than breakdown voltage $V_{B1}$, bidirectional voltage limiting element 61 is turned off to turn off bidirectional thyristor 62.

Figure 12:
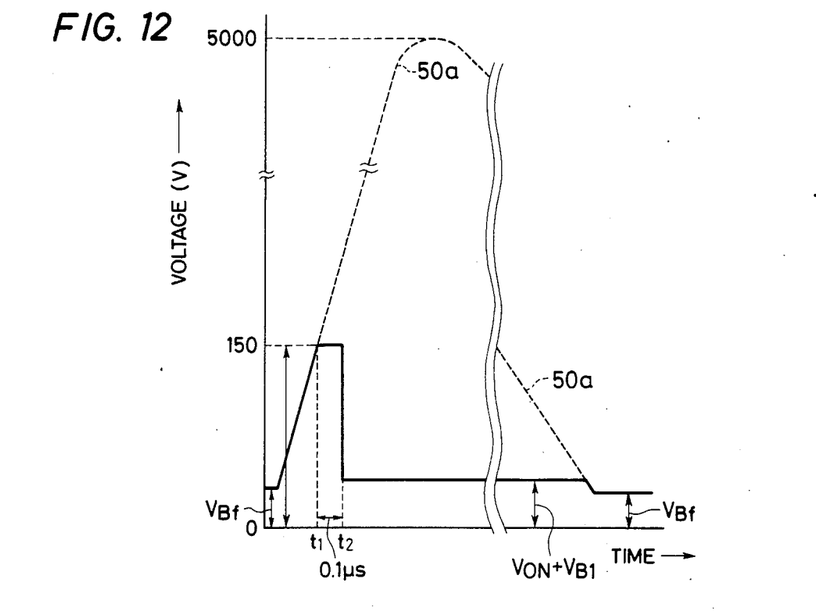
FIG. 12 is a graph showing a lightning surge input response characteristic of the protector circuit shown in FIG. 11.

Now, the manner in which the lightning surge voltage is applied to equipment 11 with time will be described with reference to FIG. 12, where it is assumed that bidirectional avalanche diodes are used for bidirectional voltage limiting elements 61 and 63 of protector circuit 64. In the absence of protector circuit 64 connected to signal line 12, the lightning surge voltage which is applied to equipment 11 becomes high as shown by dashed plot 50a to cause dielectric breakdown of equipment 11. With protector circuit 64 connected to signal line 12, as soon as the input lightning surge voltage reaches 150 V, which is the sum of breakdown voltages $V_{B1}$ and $V_{B2}$ of bidirectional avalanche diodes 61 and 63 and gate-cathode diffusion potential $V_{GK}$ of bidirectional thyristor 62, current is caused through these elements at this instant $t_1$. The voltage on signal line 12 thus is held at the constant voltage of 150 V, so that equipment 11 is protected from the lightning surge. This current constitutes the gate current to the birdirectional thyristor 62, and the thyristor 62 is turned on at instant $t_2$ approximately 0.9 sec. after instant $t_1$. With bidirectional thyristor 62 turned on, bidirectional avalanche diode 63 is turned off. That is, the "on" period of bidirectional avalanche diode 63 is as short as approximately 0.1 sec. With bidirectional thyristor 62 turned on, the voltage of protector circuit 64 is held at the sum of "on" voltage $V_{ON}$ of bidirectional thyristor 61 (which is 1 to 3 V) and breakdown voltage $V_{B1}$ of bidirectional avalanche diode 61. It will thus be seen that continual current may be cut by setting the sum voltage, i.e., $V_{ON}+V_{B1}$, to be slightly higher than battery feed voltage $V_{Bf}$. In addition, in this case since the potential is varied only slightly even after the lightning surge application, the communication state can be quickly restored.

Figure 13:
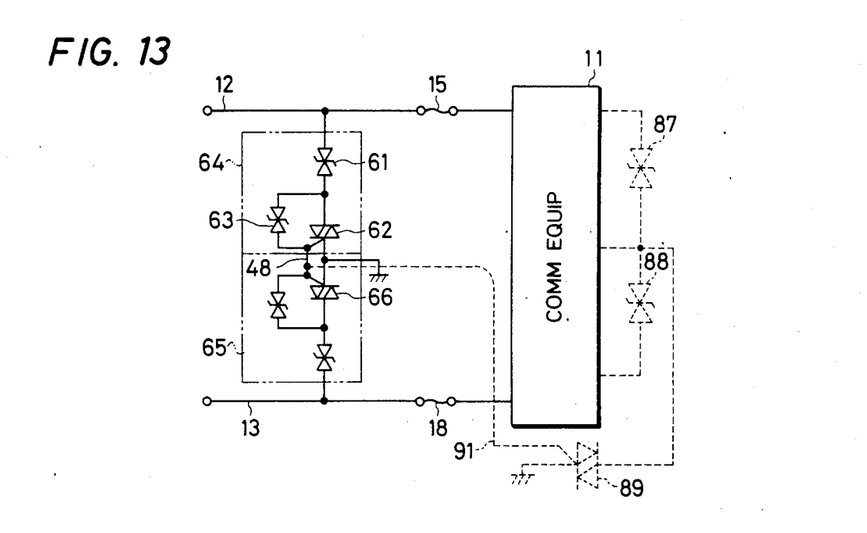
FIG. 13 is a circuit diagram showing an example of application of the circuit of FIG. 11 to an equipment having two signal lines.

Now, energy loss in protector circuit 64 will be considered. Let it be assumed that a current of 50 A peak (i.e., lightning surge peak voltage of 5,000 V divided by signal line surge impedance of 100 Ω) with a lightning surge waveform of 10/1,000 μsec. flowed in the circuit. The "on" period of bidirectional avalanche diode 63 is as short as about 0.1 sec., and the energy loss in this element is about 0.1 mJ. The "on" voltage $V_{ON}$ of bidirectional thyristor 62 is 1 to 3 V, and energy loss in this element is very low, i.e., less than 1 Joule. Thus, bidirectional thyristor 62 and bidirectional avalanche diode 63 can be realized in a small chip area. Assuming the breakdown voltage $V_{B1}$ of bidirectional avalanche diode 61 to be 35 V, the flow of the lightning surge waveform noted above through this element causes an energy loss of 1.75 J therein. The chip area, and hence the capacitance, of bidirectional avalanche diode 63 is large compared to the bidirectional thyristor 62 and bidirectional avalanche diode 63. However, since bidirectional avalanche diode 61 having the large capacitance is connected in series with the parallel connection of bidirectional avalanche diode 63 and bidirectional thyristor 62 each having small capacitance, the total capacitance of protector circuit 64 is small. The protector circuit thus can be used for high-speed, wide bandwidth communication as well. Further, since the lightning surge voltage is applied directly to bidirectional voltage limiting elements 61 and 63, and bidirectional thyristor 62 is turned on through the breakdown of elements 61 and 63, the lightning surge application can be quickly responded with the turning-on of bidirectional thyristor 62.

Where a plurality of signal lines are connected to equipment 11, protector circuits 64 and 65 may be connected between signal lines 12 and 13 and a grounding terminal, as shown in FIG. 13. Protector circuits 64 and 65 have the same construction. In this example, the gate terminals of bidirectional thyristors 62 and 66 of protector circuits 64 and 65 are connected together by line 48. Line 48 is connected to no other part to hold the gate terminals of bidirectional thyristors 62 and 66 open. In the case where a lightning surge is applied to either one of signal lines 12 and 13, it will be appreciated that the protector circuit of FIG. 13 can also protect equipment 11 in a similar manner explained with respect to the circuit shown in FIG. 11. In the case where a lightning surge is simultaneously applied to signal lines 12, 13, there would be no fear of applying an overvoltage to equipment 11 either between signal lines 12, 13 and ground or between signal lines 12 and 13. When a lightning surge is applied to signal line 12 and also to signal line 13 with a time lag behind the former, for example, to turn on bidirectional voltage limiting elements 61, 63, the on-current at that moment flows into the gates of both bidirectional thyristors 62, 66 to turn them on simultaneously, thus protecting equipment 11. Alternatively the turning on of bidirectional voltage limiting elements 61, 63 causes to turn on bidirectional thyristor 62 and the gate-cathode voltage of bidirectional thyristor 62 caused by the on-current thereof is applied across the gate and cathode of bidirectional thyristor 66 to turn it on. Since the time interval between the turn-on thyristors 62 and 66 is extremely short, the protector circuit shown in FIG. 13 can protect equipment 11 from lightning surge voltages on signal lines 12, 13 having a phase difference therebetween, that is, from transverse mode voltage.

Figure 14:
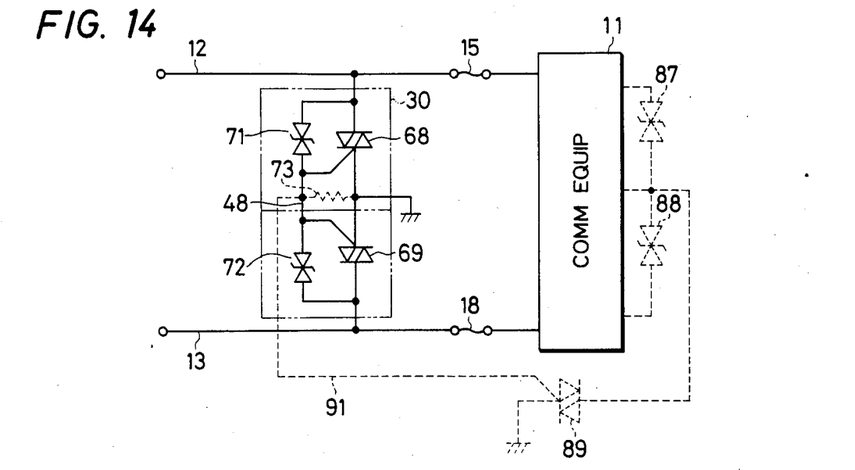
FIG. 14 is a circuit diagram showing a further protector circuit according to the invention where gates of thyristors are controlled to turn on the thyristors.

A construction as shown in FIG. 14 is also possible from the standpoint of quick operation, prevention of transverse mode voltage and simple construction. Signal lines 12 and 13 are gounded through respective bidirectional thyristors 68 and 69. Bidirectional voltage limiting elements 71 and 72 are connected between the gate and anode terminals of respective bidirectional thyristors 68 and 69. The gate terminals of bidirectional thyristors 68 and 69 are connected together by line 48. Line 48 is connected to no other part to hold the gate terminals open. Bidirectional voltage limiting elements 71 and 72 may be varistors, zener diodes, etc. The sum $(V_B + V_{GK})$ of the breakdown voltage $V_B$ and gate-cathode voltage $V_{GK}$ of bidirectional thyristors 68 and 69 is set to be higher than breakdown voltage $V_R$ of equipment 11, lower than non-operation voltage $V_A$ and higher than break-over voltage $V_{B0}$ of bidirectional thyristors 68 and 69, and may be, e.g., 150 V. Holding current $I_H$ of bidirectional thyristors 68 and 69 is set to be lower than battery feed current $I_{Bf}$ of signal lines 12 and 13.

When a lightning surge voltage is applied with a phase difference to signal lines 12 and 13, e.g., first to signal line 13, bidirectional voltage limiting element 71 is turned on, causing current to flow to the gate terminals of bidirectional thyristors 68 and 69. Bidirectional thyristors 68, 69 are thus turned on. Accordingly, no transverse mode voltage is generated between signal lines 12 and 13. Even when only thyristor 68 is firstly turned on by the on-current of bidirectional voltage limiting element 71 flowing into the gate of thyristor 68, since the "on" voltage of bidirectional thyristor 68, which is 1 V, for instance, is sufficiently low compared to the breakdown voltage $V_R$ of equipment 11, the equipment can be protected from lightning surge voltage. When the surge current becomes lower than holding current $I_H$ of bidirectional thyristors 68 and 69 with decrease of the lightning surge voltage, both bidirectional thyristors 68 and 69 are turned off.

If holding current $I_H$ of bidirectional thyristors 68 and 69 is lower than battery feed current $I_{Bf}$ bidirectional thyristors 68 and 69 remain "on" even after the disappearance of the lightning surge. To solve this problem, line 48 may be grounded through resistor 73 as shown by dashed line. The holding current of bidirectional thyristors 68 and 69 is increased by reducing the resistance of resistor 73.

Figure 15:
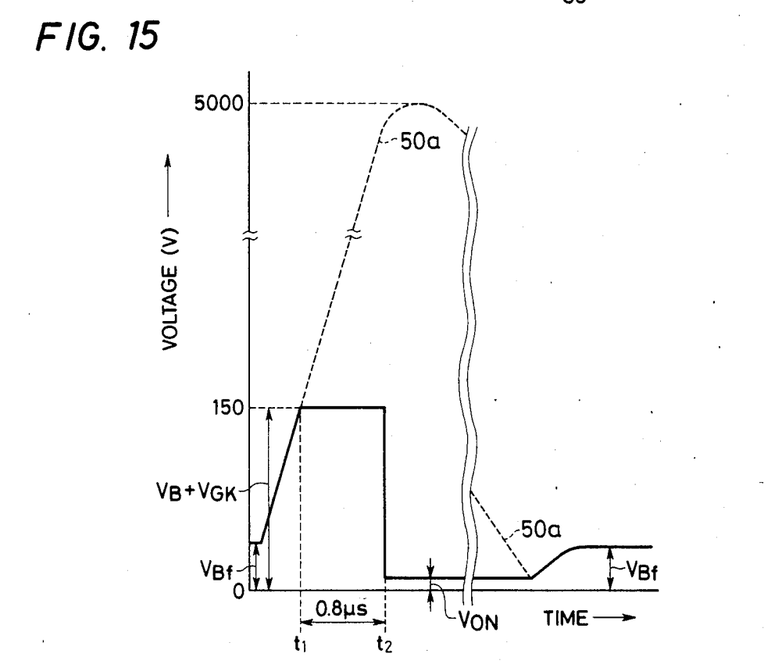
FIG. 15 is a graph showing a lightning surge input response characteristic of the protector circuit shown in FIG. 14.

FIG. 15 shows the manner in which the voltage on the input side of equipment 11 varies with lightning surge input to the protector circuit shown in FIG. 14. When the sum of breakdown voltage $V_B$ of bidirectional avalanche diode 71 and gate-cathode voltage $V_{GK}$ of bidirectional thyristor 68, i.e., 150 V, is reached at instant $t_1$ with lightning surge voltage application to signal line 12, bidirectional avalanche diode 71 is turned on, so that signal line 12 is held at that voltage. At subsequent instant $t_2$ after the lapse of a slight period, e.g., about 0.8 sec., bidirectional thyristor 68 is turned on. Signal line 12 now is held at "on" voltage $V_{ON}$ (i.e., 1 to 3 V) of bidirectional thyristor 68. Since holding current $I_H$ of bidirectional thyristor 68 is higher than that of bidirectional thyristor 62 shown in FIG. 11, the time required until this thyristor is turned on is extended, and the conduction period of bidirectional avalanche diode 71 (between instants $t_1$ and $t_2$) is 0.8 μm. The energy loss in this protector circuit is very low, i.e., 1 mJ and 1 J in bidirectional avalanche diode 71 and bidirectional thyristor 68, respectively, with a lightning surge waveform of 10/1,000 μsec. and a peak current of 50 A as in the previous case. Thus, bidirectional thyristor 68 and bidirectional avalanche diode 71 can be realized with small chip areas to reduce the capacitance between signal line 12 and ground and permit use of the protector circuit for high-speed wide-bandwidth communication. Further, both bidirectional avalanche diode 71 and bidirectional thyristor 68 can be fabricated in the same process and permit size reduction and density increase.

Where a series connection of a bidirectional thyristor and a bidirectional voltage limiting element is connected between each of the signal lines and ground and the gate terminals of the individual bidirectional thyristors are connected together as shown in FIGS. 9, 10 and 13, the bidirectional thyristors are preferably provided on the ground side with respect to the bidirectional voltage limiting elements. Although the bidirectional voltage limiting elements may be provided on the ground side, in this case the mutually connected bidirectional thyristors may fail to be turned on simultaneously if the fluctuations of the breakdown voltages of the bidirectional voltage limiting elements are excessive.

Figure 16:
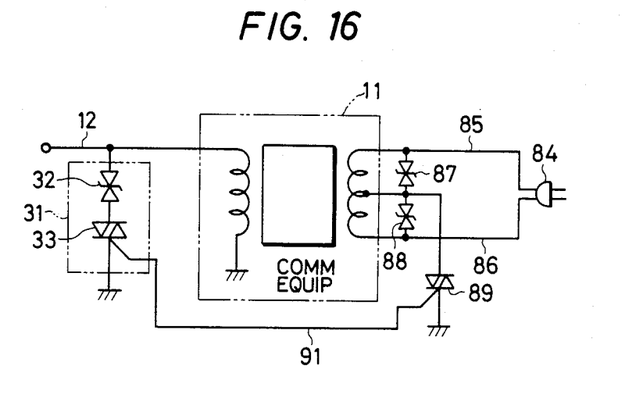
FIG. 16 is a circuit diagram showing a further protector circuit according to the invention applied to an equipment having a signal line and a power line.

In case of equipment 11 using a commercial power supply such as a facsimile apparatus, equipment 11 may be connected to commercial power lines (not shown) through connector 84, as shown in FIG. 16. In this case, a lightning surge is applied to equipment 11 via signal line 12 and also via the power line. Since the signal line and power line are laid along different routes, the lightning surge reaches equipment 11 with different waveforms and at different phases via the signal line and power line, respectively. That is, a transverse mode voltage is generated between the signal line and power line. Accordingly, power lines 85 and 86 connected to connector 84 of equipment 11 are grounded through respective bidirectional voltage limiting elements 87 and 88 and then through common bidirectional thyristor 89. The gate terminal of bidirectional thyristor 89 in the power supply side protector circuit and the gate terminal of bidirectional thyristor 33 in protector circuit 31 on the side of signal line 12 are connected together with line 91. It will be understood that with this arrangement no transverse mode voltage will be applied across equipment 11 in the event a lightning surge is applied to the signal line and also to the power line. The connection point between bidirectional voltage limiting elements 87 and 88 is connected to a primary center tap of a transformer of equipment 11.

Similar connections may be used in the other protector circuits according to the invention so long as commercial power lines are connected to equipment 11, as shown by dashed lines in FIGS. 13 and 14, for instance.

What is claimed is:

1. A protector circuit connected between a signal line connected to a communication equipment and ground for protecting said equipment from surge voltages applied to said signal line, said signal line supplying a battery feed voltage $V_{Bf}$ to said communication equipment, said protector circuit comprising:
   a bidirectional voltage limiting element having a breakdown voltage $V_B$ slightly higher than the battery feed voltage $V_{Bf}$ on said signal line and lower than a predetermined non-operation voltage $V_A$ of said protector circuit; and
   a bidirectional thyristor connected in series with said bidirectional voltage limiting element, the sum of the break-over voltage $V_{B0}$ of said bidirectional thyristor and said breakdown voltage $V_B$ being lower than the breakdown voltage $V_R$ of said equipment and higher than said non-operation voltage $V_A$.

2. The protector circuit according to claim 1, wherein a plurality of signal lines are connected to said equipment, a plurality of said series connected bidirectional voltage limiting elements and bidirectional thyristors being connected respectively between each said signal line and ground, said bidirectional thyristors having their respective gate terminals connected together and held open without being connected to any other part.

3. The protector circuit according to claim 2, wherein said bidirectional thyristor in each said series connection is provided on the ground side with respect to said bidirectional voltage limiting element.

4. The protector circuit according to claim 1, wherein said bidirectional thyristor has a gate terminal, a commercial power line is connected to said equipment, and a second bidirectional thyristor is connected between said commercial power line and ground, said second bidirectional thyristor having a gate terminal which is connected to the gate terminal of said first mentioned bidirectional thyristor.

5. The protector circuit according to claim 2, wherein a commercial power line is connected to said equipment, and a further bidirectional thyristor is connected between said commercial power line and ground, said further bidirectional thyristor having a gate which is connected to the gate terminals of said first mentioned bidirectional thyristors.

6. A protector circuit connected between a signal line connected to a communication equipment and ground for protecting said equipment from surge voltages applied to said signal line, said signal line supplying a battery feed voltage $V_{Bf}$ to said communication equipment, said protector circuit comprising:
   a first bidirectional voltage limiting element having a breakdown voltage $V_1$ slightly higher than the battery feed voltge $V_{Bf}$ on said signal line;
   a bidirectional thyristor connected in series with said first bidirectional voltage limiting element; and
   a second bidirectional voltage limiting element connected between the gate and anode terminals of said bidirectional thyristor;
   the sum of the breakdown voltages $V_{B1}$ and $V_{B2}$ of said first and second bidirectional voltage limiting elements and the gate-cathode voltage $V_{GK}$ of said bidirectional thyristor being lower than the breakdown voltage $V_R$ of said equipment and higher than a predetermined non-operation voltage $V_A$ of said protector circuit, said breakdown voltage $V_{B2}$ of said second bidirectional voltage limiting element being lower than the break-over voltage $V_{B0}$ of said bidirectional thyristor.

7. The protector circuit according to claim 6, wherein a plurality of signal lines are connected to said equipment, a circuit including said first bidirectional voltage limiting element, said bidirectional thyristor in series thereto and said second bidirectional voltage limiting element connected between the gate and anode terminals of said bidirectional thyristor being connected between each of said signal lines and ground, the gate terminals of said individual bidirectional thyristors being connected together.

8. The protector circuit according to claim 7, wherein said bidirectional thyristor in each said circuit is provided on the ground side with respect to the associated first bidirectional voltage limiting element.

9. The protector circuit according to claim 6, wherein a commercial power line is connected to said equipment, and a second bidirectional thyristor is connected between said commercial power line and ground, the gate terminal of said second bidirectional thyristor being connected to the gate terminal of said first mentioned bidirectional thyristor.

10. The protector circuit according to claim 7, wherein a commercial power line is connected to said equipment, and a further bidirectional thyristor is connected between said commercial power line and ground, the gate terminal of said further bidirectional thyristor being connected to the gate terminals of said first mentioned bidirectional thyristors.

11. A protector circuit connected between each of a plurality of signal lines connected to a communication equipment and ground for protecting said equipment from surge voltages applied to said signal line, each of said signal lines supplying a battery feed current to said communication equipment, said protector circuit comprising:

bidirectional thyristors connected between respective ones of said signal lines and ground and each having a holding current higher than the battery feed current to each said signal line; and bidirectional voltage limiting elements each connected between the gate and anode terminals of respective ones of said bidirectional thyristors, the sum of the breakdown voltage $V_B$ of each said bidirectional voltage limiting element and the gate-cathode voltage of each said bidirectional thyristor being higher than a predetermined non-operation voltage $V_A$ of said protector circuit and lower than the breakdown voltage $V_R$ of said equipment, said breakdown voltage $V_B$ of each said bidirectional voltage limiting element being lower than the break-over voltage $V_{BO}$ of each said bidirectional thyristor;

the gate terminals of respective ones of said bidirectional thyristors being connected together.

12. The protector circuit according to claim 11, wherein the gate terminals of said bidirectional thyristors are grounded through a common resistor.

* * * * *